Figure 1:
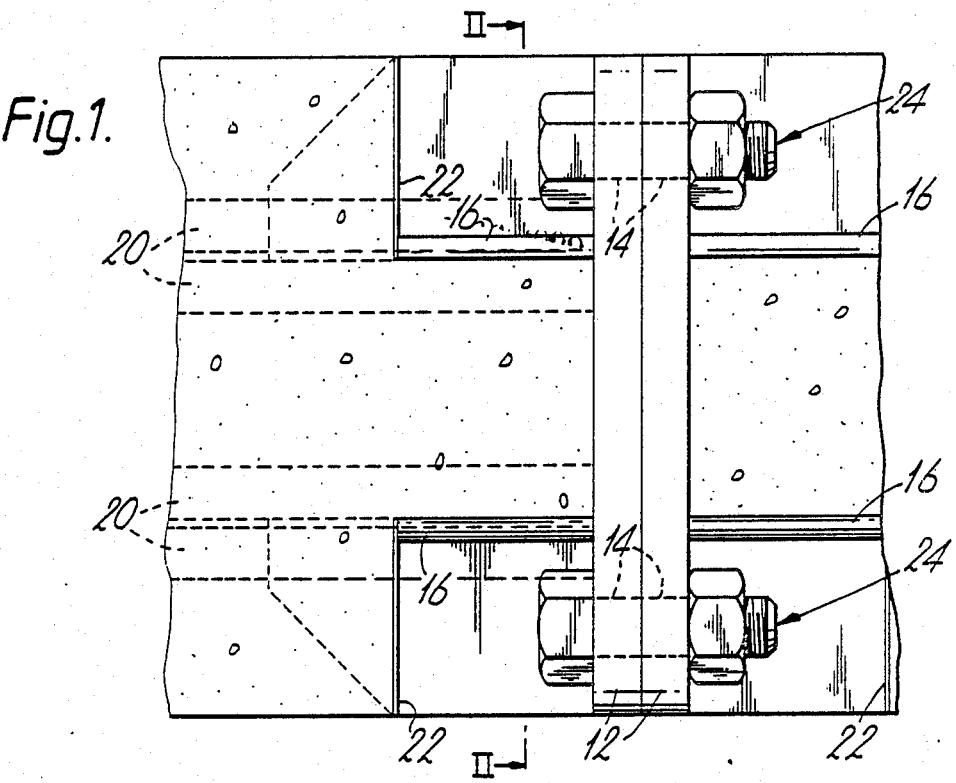

United States Patent [19]

Russell

[11] Patent Number: 4,938,635

[45] Date of Patent: Jul. 3, 1990

[54] CONCRETE BEAMS AND CONNECTING MEANS THEREFOR

[76] Inventor: James B. Russell, 157 Shore Road, Magheramorne, Larne, County Antrim BT40 3HY, United Kingdom

[21] Appl. No.: 265,850

[22] PCT Filed: Dec. 17, 1986

[86] PCT No.: PCT/GB86/00769

§ 371 Date: Oct. 25, 1988

§ 102(e) Date: Oct. 25, 1988

[87] PCT Pub. No.: WO88/04711

PCT Pub. Date: Jun. 30, 1988

[51] Int. Cl.5 .............................................. E02D 5/14
[52] U.S. Cl. ..................... 405/252; 405/251; 405/231; 403/337; 52/722; 52/726
[58] Field of Search ....................... 52/726, 722, 296; 403/337; 405/251, 252, 239, 231

[56] References Cited

U.S. PATENT DOCUMENTS

| | | | |
|---|---|---|---|
| 2,086,009 | 7/1937 | Walker | 52/726 X |
| 3,961,491 | 6/1976 | Reddaway et al. | 52/726 X |
| 4,009,550 | 3/1977 | Young | 52/726 |
| 4,050,211 | 9/1977 | Wahman | 52/726 |
| 4,074,500 | 2/1978 | Bisutti | 52/726 |
| 4,196,557 | 4/1980 | Silvander | 52/726 X |

Primary Examiner—David A. Scherbel
Assistant Examiner—Lan Mai
Attorney, Agent, or Firm—Armstrong, Nikaido, Marmelstein, Kubovcik & Murray

[57] ABSTRACT

A beam of concrete has similar end pieces at each end spaced apart by an internal reinforcing elongate cage of rectangular cross-section formed of four longitudinals (10) having a lengthwise series of hoops therearound. Each end piece comprises a rectangular plate (12) transverse of the beam's longitudinal axis. The plate (12) has at least four apertures (14), normally one at each corner, and similar angular wall surrounds (16) outstand from the inner face of the plate (12) and from around the apertures (14) to separate each aperture from the others. Two starter bars (20) are provided for each surround (16), being welded, one to each limb of the surround (16) adjacent to the corner on the side remote from the corresponding aperture. The bars (20) are spaced from each other a distance to accommodate therebetween a respective longitudinal (10) of the cage. Nut and bolt fastenings (24) are used to secure abutting plates (12) of adjacent beams in a multi-beam assembly.

5 Claims, 1 Drawing Sheet

U.S. Patent
Jul. 3, 1990
4,938,635

CONCRETE BEAMS AND CONNECTING MEANS THEREFOR

This invention relates to beams of concrete or equivalent material for use in creating multi-beam assemblies to be used as piles in the ground by the beams being driven uprightly thereinto, or as columns and horizontals in the erection of a superstructure for a building with or without using a substructure of piles formed of conventional beams or of beams of the present invention. The invention also relates to connecting means for joining said beams.

Such conventional beams are normally of rectangular cross-section and are formed of concrete cast around a cagework having two metal end pieces, one each at an opposite end of a cage of rectangular crosssection formed of four longitudinals, one at each corner of the rectangle, and having a lengthwise spaced series of hoops secured therearound.

There is continuing research and development into the construction of such beams and in particular to the connecting means or joint between two beams to improve the ultimate flexure capacity of a moment joint therebetween, and this invention is primarily concerned with connecting means between two beams.

Hereinafter in specification and claims, the term "concrete" issued to include any equivalent material which can be cast around a cagework when fluent and thereafter solidifying on curing.

In accordance with one aspect of the present invention, there is provided a beam of concrete having similar end pieces at each opposite end and an internal reinforcing elongate cage, each end piece comprising a rectangular plate transverse of the beam's longitudinal axis and apertured with wall surrounds outstanding from the inner face thereof, one from around each aperture to partition off each aperture on the plate, at least one starter reinforcing bar being secured to each surround to extend elongate with the beam's axis, said starter bars overlapping with longitudinals of said cage with concrete being cast around said cage and over the outer ends of said wall surrounds and into the void defined among the wall surrounds and each plate.

In accordance with a second aspect of the present invention, there is provided a multi-beam assembly formed from a series of beams in end-to-end relationship with connecting means securing one to the other, each beam being of concrete and having similar end pieces at each end and an internal reinforcing elongate cage, each end piece comprising a rectangular plate transverse of the beam's longitudinal axis and apertured with wall surrounds outstanding from the inner face thereof and from around each said corner to partition off each aperture on the plate, at least one starter reinforcing bar being secured to each surround to extend elongate with the beam's axis, said starter bars overlapping with the longitudinals of said cage with concrete being cast around said cage and over the outer ends of said wall surrounds and into the void defined among the wall surrounds and each plate, the connecting means comprising said apertured plates and bolt and nut fastenings, one through each of the aligned holes of abutting plates of beams in said assembly.

Preferably, the wall surrounds are similar and angular. The cage and end pieces are of metal or equivalent material. Two starter bars for each surround are preferably provided, one welded to each limb of the surround adjacent to the corner thereof on the side remote from the corresponding aperture and spaced from each other a distance to accomadate therebetween a respective longitudinal of the cage.

Alternatively, one starter is welded at the apex of the surround on the same side as the corresponding aperture.

Figure 2:
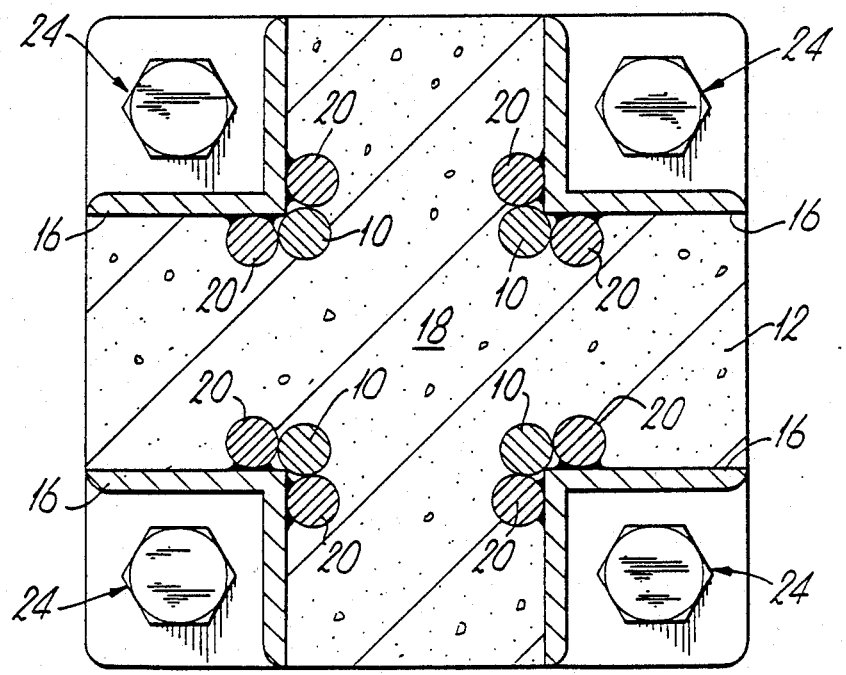

An embodiment of the present invention will now be described, by way of example, with reference to the accompanying diagrammatic drawings, in which:

FIG. 1 is a side elevation showing a detail of a joint between two beams in a multi-beam assembly according to the present invention; and FIG. 2 is a cross-sectional view on the line II—II of FIG. 1.

Referring to the drawings, a beam is of concrete and of rectangular, normally square, cross-section. The concrete is cast around a cagework having two end pieces spaced apart by elongate cage of rectangular cross-section formed of four metal longitudinals 10, one at each corner of the rectangle, having a lengthwise spaced series of metal rectangular hoops (not shown) therearound and secured thereto by wire. Each end piece comprises a rectangular metal plate 12 areal dimensions similar to the beam's cross-section and oriented transverse of the beam's longitudinal axis. The plate 12 has four apertures 14 therein as shown, one at each corner. From the inner face of the plate 12 and from around each corner, as shown in FIG. 2, to separate or partition off each aperture 14 from the plate and the other apertures, four similar angular metal elongate wall surrounds 16 outstand forming thereamong, with the plate 12, a void 18 of cruciform areal shape and depth the length of the surround. The surrounds 16 have each two limbs to each of which is secured by welding a metal starter reinforcing bar 20, the bar 20 being positioned adjacent to the corner and spaced apart a distance sufficient to accomodate a longitudinal 10 as shown particularly in FIG. 2. The starter bars 20 are preferably, but not necessarily, secured to the longitudinals to untie the end pieces with the cage by using tying wire. Alternatively, the starter bars 20 can simply overlap with the longitudinals 10.

For each surround 16, a square plate 22 (FIG. 1) can be provided as a web parallel, but not necessarily so, to the plate 12 to form with the surround a four walled housing. The surround preferably extends lengthwise of the beam beyond said web 22 and the corners of each limb may be cut-away as shown in FIG. 1.

The beams are cast in a mould into which the cagework is fitted, the concrete being filled around the cage and into the voids of the end pieces. The concrete is also cast around the outer ends of the surrounds as shown in FIG. 1, and to prevent cement from the concrete entering the housings, blocks of complementary volume of polystyrene or similar material are plugged thereinto to be removed therefrom when the concrete has set and cured. Multi-moulds may be used to make several beams at the one time.

In use, beams are connected by aligning abutting plates 12 as shown in FIG. 1 so that their apertures come into registry and by using four bolt and nut fastenings 24, secure them together. The connecting means comprises the plates 12 and the fastenings 24. Each joint has a capability of equal moment capacity to the beam. The centres of gravity at each corner of the bolt, wall surround, starter bars and longitudinal are very near each other and this has proved particularly beneficial.

In relation to beams for use in erecting a superstructure of columns and/or horizontals, the rectangular cross/sectional area may be greater than those for use as piles. Accordingly, without departing from the scope of the above-described invention and for such beams, the plates may have more than four apertures, such apertures being provided intermediate of and equispaced from the two apertures on each side. Depending on the areal dimensions of the plate, one, or two, or more apetures may be provided on one or both pairs of opposite sides of the plate. For each of these additional apertures, a housing is provided comprising a wall surround of, for example a three sided channel shape with the open side outwardly facing, and a web plate, if required, similarly shaped and provided as hereinbefore described.

Also, without departing from the scope of the invention, and depending on the intended use of the beams in the superstructure, apertures may only be provided along one side of the plates, or may be assymmetrically positioned relative to the plates.

In a modification, the shape of the surround may be other than angular such as curved or three sided. Also, in a further modification, the web plate 22 can be omitted.

I claim:

1. A beam of concrete having similar end pieces at each opposite end and an internal reinforcing elongate cage with longitudinals, each end piece comprising:

a rectangular plate with four apertures defined therein, said plate located transverse of the beam's longitudinal axis;

four wall surrounds of angular shape upstanding from an inner face of said plate each wall surround having an apex, one of each said wall surrounds located around each aperture to partition off a respective aperture from a cruciform void defined between said wall surrounds and said plate, the cage and end pieces being of weldable material; and at least one starter reinforcing bar being secured to each said wall surround adjacent to an apex thereof on a side remote from each said respective aperture to extend parallel with the beam's longitudinal axis, said starter bars overlapping with the longitudinals of said cage with concrete being cast around said cage and over the outer ends of said wall surrounds and into the void, defined by said plate and said wall surrounds.

2. A beam according to claim 1, wherein two starter bars for each said wall surround are provided, each said starter bar welded to a face of said wall surround adjacent to the apex thereof on the side remote from said respective aperture and spaced from each other a distance to accommodate therebetween at least one of the longitudinals of the cage.

3. A beam according to claim 1, wherein one starter bar is provided for each said wall surround and is welded at the apex of said wall surround on a side facing the said respective aperture of said wall surround.

4. A beam according to claim 1, wherein a web plate is provided for each said wall surround positioned substantially parallel to the plate of the end piece to form with said wall surround, a housing.

5. A multi-beam assembly comprising:

a series of beams in end-to-end relationship, each said beam of concrete having similar end pieces at each opposite end and an internal reinforcing elongate cage with longitudinals, each end piece including:

(a) a rectangular plate with four apertures defined therein, said plate located transverse of the beam's longitudinal axis, (b) four wall surrounds of angular shape upstanding from an inner face of said plate, one of each said wall surrounds located around each aperture to partition off a respective aperture from a cruciform void defined between said wall surrounds and said plate, the cage and end pieces being of weldable material, and (c) at least one starter reinforcing bar being secured to each said wall surround adjacent to an apex thereof on a side remote from each said respective aperture to extend parallel with the beam's longitudinal axis, said starter bars overlapping with the longitudinals of said cage with concrete being cast around said cage and over the outer ends of said wall surrounds and into the void defined by said plate and said wall surrounds; and connecting means for securing at least one said beam to another said beam, said connecting means including bolt and nut fastenings positioned through the apertures of one said beam aligned with the apertures of another said beam.

* * * * *